United States Patent
Ito et al.

(10) Patent No.: US 6,511,350 B1
(45) Date of Patent: Jan. 28, 2003

(54) CARD CONNECTOR

(75) Inventors: Toshiyasu Ito, Chiba (JP); Shigeru Sato, Chiba (JP); Takahiro Sakamoto, Osaka (JP)

(73) Assignees: Yamaichi Electronics Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/705,747

(22) Filed: Nov. 6, 2000

(30) Foreign Application Priority Data

Nov. 8, 1999 (JP) .......................................... 11-317534

(51) Int. Cl.⁷ .............................................. H01R 13/64
(52) U.S. Cl. .................. 439/680; 439/677; 439/630; 439/64; 439/377
(58) Field of Search ............................... 439/680, 681, 439/674, 677, 630, 64, 377

(56) References Cited

U.S. PATENT DOCUMENTS

| | | | |
|---|---|---|---|
| 3,823,367 A | * 7/1974 | Kaye et al. ................. | 320/114 |
| 3,932,016 A | 1/1976 | Ammenheuser | |
| 4,780,603 A | * 10/1988 | Hamada ...................... | 235/441 |
| 4,864,116 A | * 9/1989 | Banjo et al. ................ | 439/680 |
| 5,036,430 A | * 7/1991 | Hills .......................... | 235/492 |
| 5,198,645 A | 3/1993 | P. Martin et al. | |
| 5,207,598 A | 5/1993 | Yamada et al. | |
| 5,320,552 A | 6/1994 | Reichardt et al. | |
| 5,374,198 A | 12/1994 | Nagata | |
| 5,581,127 A | 12/1996 | Shinohara | |
| 5,668,365 A | 9/1997 | Ito et al. | |
| 5,872,353 A | 2/1999 | Reichardt et al. | |
| 6,068,500 A | 5/2000 | Kanter | |
| 6,089,919 A | * 7/2000 | Nishioka .................... | 439/630 |
| 6,126,486 A | 10/2000 | Chang | |
| 6,129,571 A | 10/2000 | Ikemoto | |
| 6,213,785 B1 | 4/2001 | Nishio et al. | |
| 6,234,845 B1 | 5/2001 | Hakozaki | |

FOREIGN PATENT DOCUMENTS

| | | | |
|---|---|---|---|
| EP | 0284431 A2 | * 9/1988 | ................. 439/630 |
| EP | 0 284 431 A2 | 9/1988 | |
| JP | 1-168978 | 11/1989 | |
| JP | 2-187887 | 7/1990 | |
| JP | 5-502746 | 5/1993 | |
| JP | 06-044052 | 2/1994 | |
| JP | 06-162281 | 6/1994 | |
| JP | 7-153524 | 6/1995 | |
| JP | 8-315081 | 11/1996 | |
| JP | 09007694 | 1/1997 | |
| JP | 10091729 | 4/1998 | |
| JP | 10-240871 | 9/1998 | |
| JP | 11-053503 | 2/1999 | |

OTHER PUBLICATIONS

U.S. patent application Ser. No. 09/703,669, Ito et al., filed Nov. 2, 2000.
U.S. patent application Ser. No. 09/869,784, Ito et al., filed Jul. 5, 2001.
U.S. patent application Ser. No. 09/890,637. Abe et al., filed Aug. 3, 2001.
International Search Report Application No. PCT/JP00/07762, dated Feb. 6, 2001.

* cited by examiner

*Primary Examiner*—Tho D. Ta
(74) *Attorney, Agent, or Firm*—Finnegan, Henderson, Farabow, Garrett & Dunner LLP

(57) ABSTRACT

The card connector of this invention has an erroneous insertion prevention mechanism that blocks the IC card at a predetermined blocking position when the IC card is wrongly inserted into the connector body. The erroneous insertion prevention mechanism has a blocking member retractably supported on the first side wall and an urging means to normally urge the blocking member to project inwardly from the second side wall. When the IC card is inserted in a correct orientation, the blocking member is guided by the inclined surface of the IC card to be retracted outwardly from the first side wall. When the IC card is inserted in a wrong orientation, the blocking member abuts against the front end of the IC card, blocking the further insertion of the IC card at the blocking position.

8 Claims, 15 Drawing Sheets

CARD CONNECTOR

This application is based on Patent Application No. 11-317534 filed Nov. 8, 1999 in Japan, the content of which is incorporated hereinto by reference.

BACKGROUND OF THE INVENTION

FIELD OF THE INVENTION

The present invention relates to a card connector for removably holding an IC card such as memory card and more specifically to a card connector having an erroneous insertion prevention function to prevent the IC card from being inserted to a connected position when the IC card is inserted in an inappropriate state, e.g., upside down.

DESCRIPTION OF THE RELATED ART

Today the memory capacity is rapidly growing thanks to the remarkable advance of electronic circuit integration technology and there is a growing trend for using thin, small IC cards in the recording of various information such as characters, video and audio. Under this circumstance a variety of connectors for connecting the IC cards and electronic devices are being proposed and implemented.

FIG. 10A and FIG. 10B show one example of currently proposed IC card 1. As shown in the figure, the IC card 1 has a card body 2 incorporating an IC circuit in an almost rectangular case and a plurality of contacts 3 connected to the IC in the card body 2 and lead out from the card body 2 to an external front end of the body 2. The card body 2 is formed with a raised portion 4a protruding outwardly on its back surface 4 and also with a inclined surface 5 at one corner.

The raised portion 4a is rectangular in shape with its width t1 between side surfaces 4a2, 4a2 which is smaller than a width between outer side surfaces 1a, 1a of the card body 2. The raised portion 4a shown here includes a plurality of separation walls 6 formed in the front portion of the back surface 4 of the card body 2 to separate contacts 3 from one another. The contacts 3 are attached on the back surface 4 between the separation walls 6 securely.

The inclined surface 5 is formed by cutting one corner of the front part of the card body 2 at angle, which makes the front part of the card body 2 asymmetric with respect to the direction of card insertion (X direction).

FIG. 11 shows a card connector 10 for holding the IC card. The card connector 10 has a connector body 11 for holding the IC card 1 so that it can be inserted and retracted, and also electric contacts 12 for making electric contact with the IC card 1 inserted into the connector body.

The connector body 11 has side portions 13, a bottom portion 14, and a top plate portion 15. The side portions 13 have first side walls 13a for guiding sides surfaces of the IC card 1. The bottom portion 14 has support surfaces 14a for supporting the back surface 4 or front surface 7 of the IC card 1 and stepped portions 14b that engage the raised portion of the IC card so that the raised portion 4a can be moved in the direction of IC card insertion and retraction. The top plate portion 15 keeps the IC card 1 from floating up. The electric contacts 12 are disposed to correspond to the contacts 3 of the IC card 1 and held on the bottom portion 14 like cantilevered springs.

The connector body 11 is placed at a predetermined position on a printed circuit board of an electronic device, with the lower end portions of the electric contacts 12 soldered to predetermined conductive portions of the printed circuit board.

When the IC card 1 is to be connected to the card connector 10 of the above construction, it is inserted into the insertion direction (X direction) with the front surface 7 facing up, the back surface 4 supported on the support surfaces 14a and both of the outer side surfaces 12, 12 of the IC card 1 guided by both of the side walls 13a of the connector body 11. At this time, the side surfaces 4a2, 4a2 of the raised portion 4a formed on the back surface 4 of the IC card 1 engages the stepped portions 14b of the bottom portion 14 of the connector body 11 as the IC card 1 is inserted.

Then, when the front end portion of the IC card 1 abuts an abutment portion 16 of the connector body 11 (see FIG. 14), the contacts 3 contact the electric contacts 12, thus completing the connection (see FIG. 12). In this insertion operation, the IC card 1 is prevented from floating upward and getting dislocated by the inner surface of the top plate portion, so anyone can perform an insertion and connection operation easily and correctly.

In the connector shown in FIG. 11, as long as the IC card 1 is oriented correctly while being inserted, the connection to the card connector 10 can easily and reliably performed. When the IC card 1 is wrongly oriented and inserted, the card connector may be damaged. This is the problem with the conventional card connector that degrades the operability.

For example, when the IC card 1 is inserted upside down, as shown in FIG. 13, the raised portion 4a formed at the bottom of the IC card 1 and protruding upward abuts against the rear end of the top plate portion 15, as shown in FIG. 14. This state, however, is not a completely inserted state and there is a chance of the user further pushing the card with force.

In this case, because the raised portion 4a projects slightly above the inner surface of the top plate portion 15 as shown in FIG. 14, the IC card 1, when applied with a strong push, is forcibly inserted between the bottom portion 14 and the top plate portion 15 of the connector body 11, as shown in FIG. 15, deforming the top plate portion 15.

In the event of such a trouble, the side portions 13 of the connector body 11 are also deformed along with the top plate portion 15, exerting a load on soldered fittings on the side portion 13 of the connector body 11 used to secure the connector to the printed circuit board and also on soldered portions of the contacts, which in turn causes the soldered portions to come off, degrading the connection reliability of the connector.

The present invention has been accomplished to solve the above-described problems of the card connector and provide a highly reliable card connector capable of preventing the IC card from being inserted in an inappropriate orientation and thereby protecting the card from being damaged due to the inappropriate insertion.

SUMMARY OF THE INVENTION

To solve these problems, the present invention has the following construction.

According to an aspect, this invention provides a card connector having a connector body for removably holding an IC card and electric contacts for making electric connection with the IC card inserted into the connector body, wherein the IC card has on its back surface a raised portion and is slightly narrower than a connector body width between its both side surfaces, the connector body comprising: a pair of left and right side portions each having a first side wall, the first side walls guiding left and right side surfaces of the IC card in an insertion/retraction direction of the IC card; a bottom portion having a support surface to support a front surface or back surface of the IC card and a pair of left and right second side walls, the second side walls projecting inwardly from the first side walls and, in an IC card back surface supporting state, guiding side surfaces of the raised portion formed on the back surface of the IC card in the insertion/retraction direction of the IC card; a top plate portion provided opposite the bottom portion to keep the inserted IC card from floating up; and an erroneous insertion prevention mechanism to allow the insertion of the IC card when it is inserted into the connector body in an appropriate state with the front surface of the IC card facing up and, when the IC card is inserted in an inappropriate state with the front surface facing down, to block the forward movement of the IC card in the card insertion direction at a blocking position, the blocking position being set a predetermined distance forward from a rear end of the card body; wherein the erroneous insertion prevention mechanism has: a blocking member retractably supported on one of the first side walls in such a manner that when the blocking member is projected, it is situated inward from the second side wall and that when the blocking member is retracted, it is situated outward from the first side wall; and an urging means to normally urge the blocking member to project inwardly from the second side wall; wherein when the IC card is correctly inserted, the blocking member is guided by the inclined surface 5 formed in the IC card to be retracted outwardly from the first side wall and when the IC card is wrongly inserted, the blocking member abuts against a front end of the IC card, blocking the further insertion of the IC card at the blocking position; wherein the left and right second side walls and the support surface of the bottom portion are eliminated in an area ranging from a rear end of the first side wall to the blocking position.

Rather than eliminating the second side walls and the support surface of the bottom portion in an area ranging from the rear end of the first side wall to the blocking position, it is possible to increase the distance between the top plate portion and the opposing support surface of the bottom portion in the area ranging from the rear end of the first side wall to the blocking position or to form an engagement groove in that area to movably receive the raised portion of the IC card in the card insertion/retraction direction. The engagement groove may be formed by a notched groove formed slightly wider than the raised portion and extending inwardly from the rear end of the top plate portion with respect to the IC card insertion direction, or may be formed by a recessed surface portion recessed upward from the underside of the top plate portion.

Further, in this invention, if the distance from the rear end of the first side wall with respect to the IC card insertion direction to the blocking position is set larger than the length in the IC card insertion direction of the inclined surface of the IC card, the movement of the IC card as it is inserted can be stabilized, enabling the wrongly inserted IC card to be more reliably blocked by the blocking member.

The above and other objects, features and advantages of the present invention will become more apparent from the following description of embodiments thereof taken in conjunction with the accompanying drawings.

DETAILED DESCRIPTION OF THE PREFERRED EMBODIMENTS

Now, embodiments of this invention will be described by referring to the accompanying drawings.

(First Embodiment)

FIGS. 1 to 7 represent a card connector as the first embodiment of the invention. In these figures, constitutional elements identical with those of the prior art are given like reference numbers.

Figure 10A:
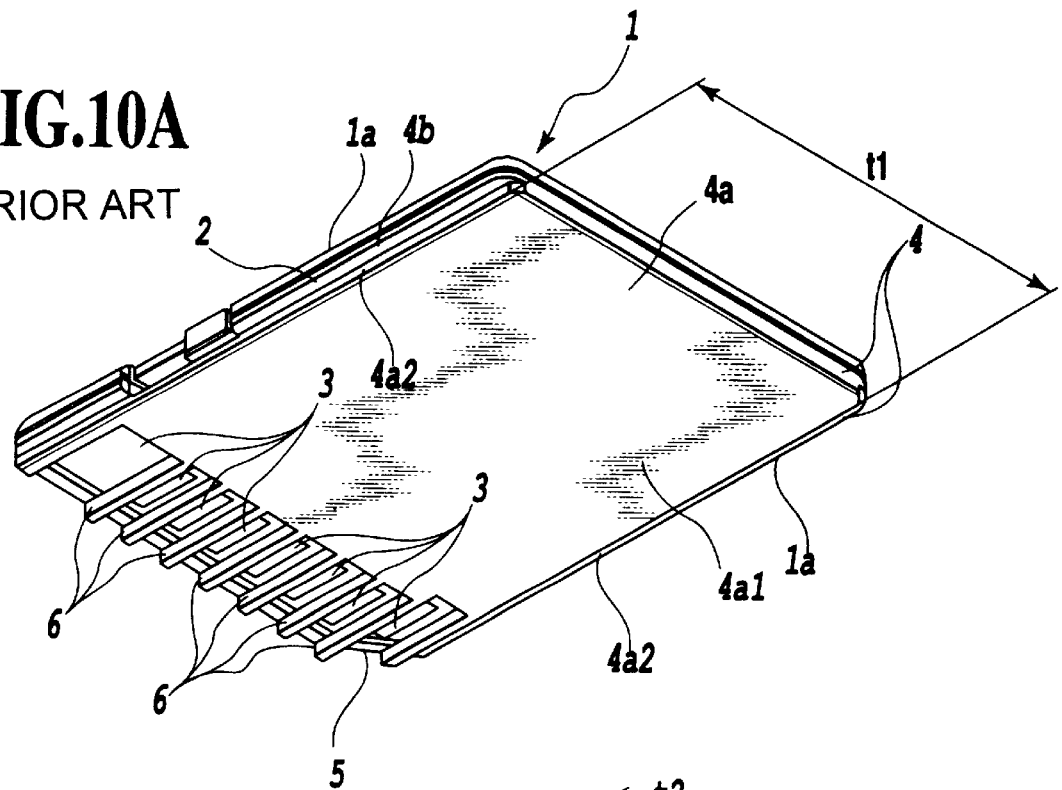
FIG. 10A is a perspective view of the IC card as seen from the bottom side.
Figure 10B:
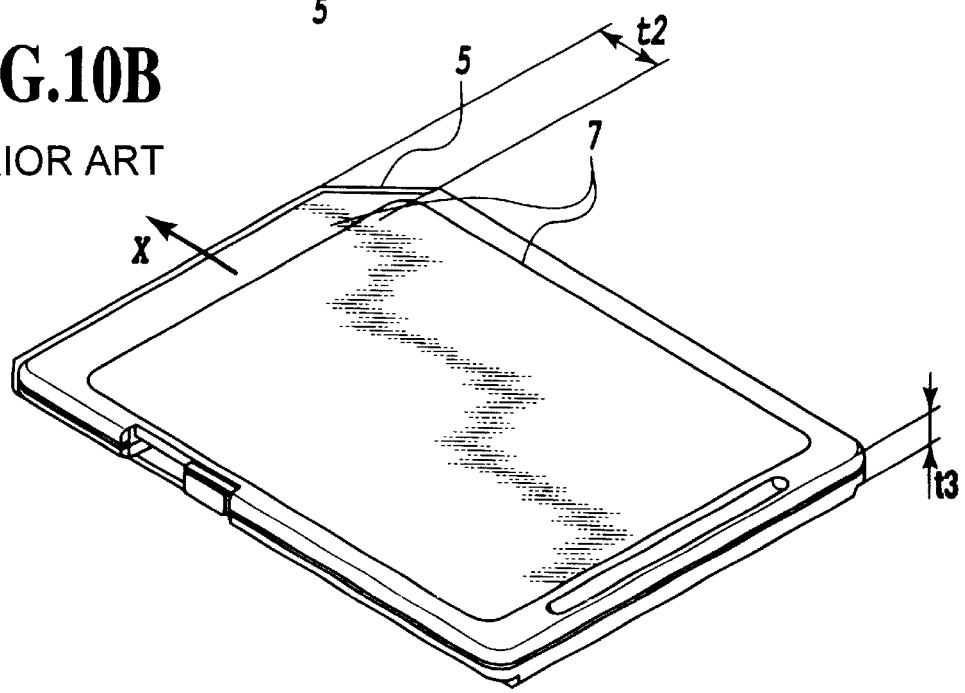
FIG. 10B is a perspective view of the IC card as seen from the top side.
Figure 11:
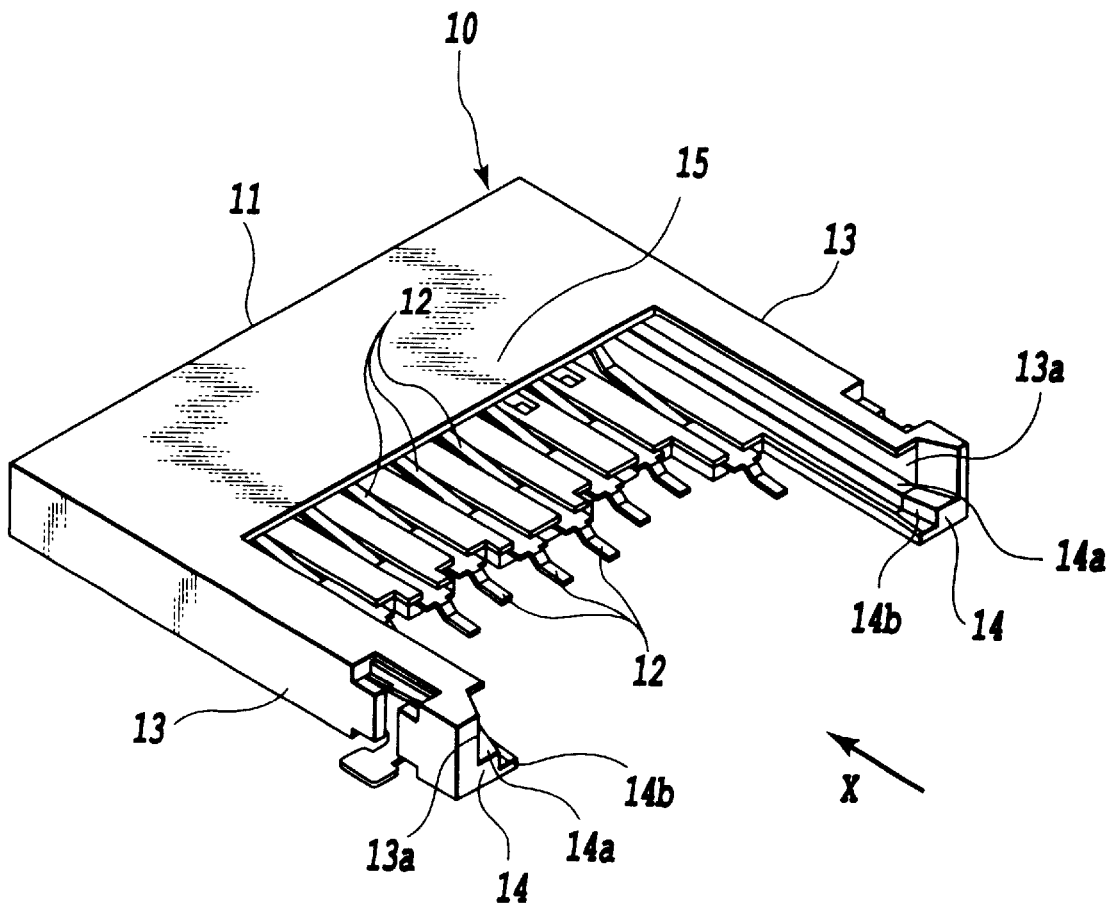
FIG. 11 is a perspective view of a card connector based on a prior art of this invention.
Figure 12:
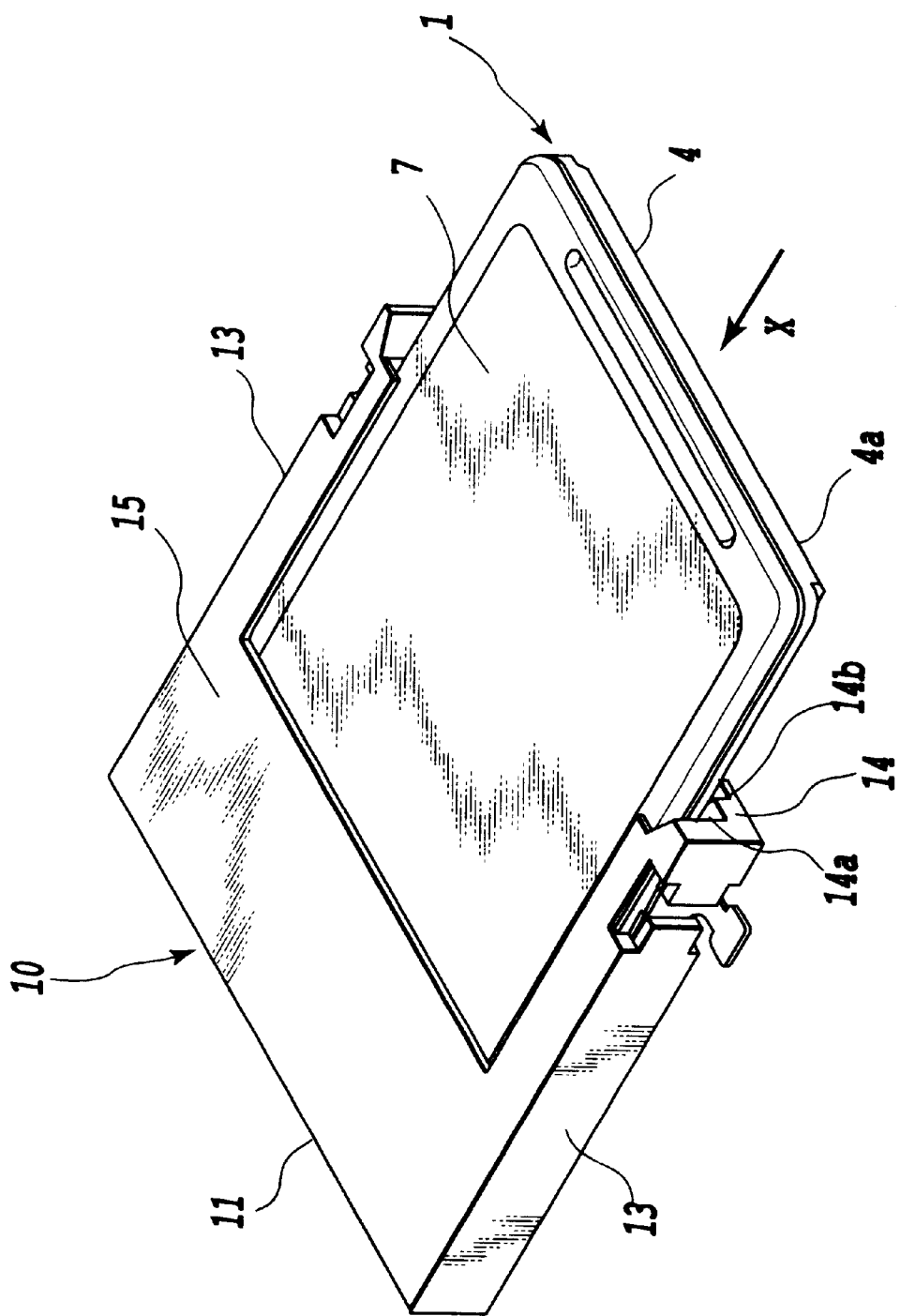
FIG. 12 is a perspective view showing the IC card inserted in an appropriate state into the card connector of FIG. 9.
Figure 13:
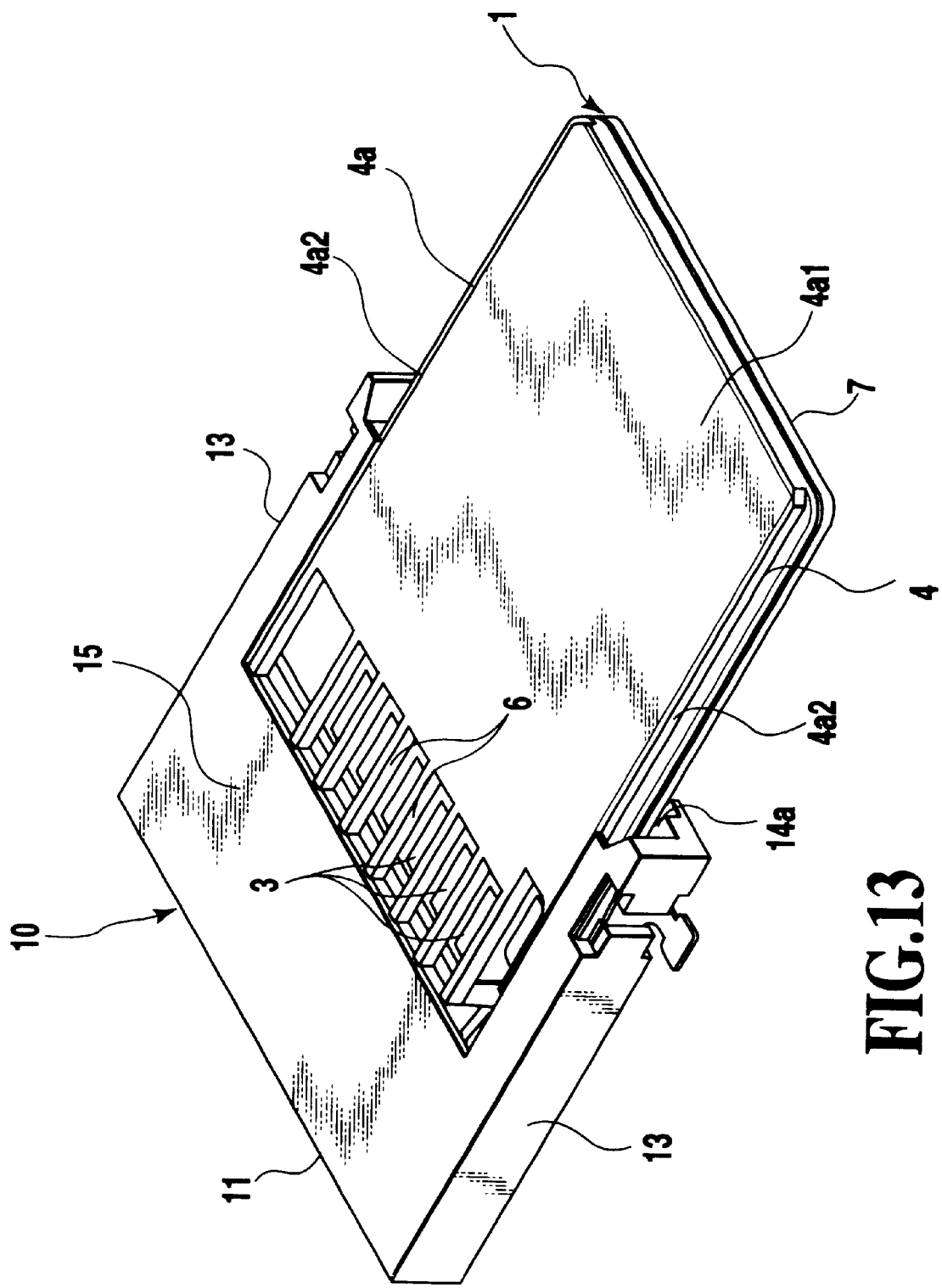
FIG. 13 is a perspective view showing the IC card inserted in an inappropriate state into the card connector of FIG. 9.
Figure 14:
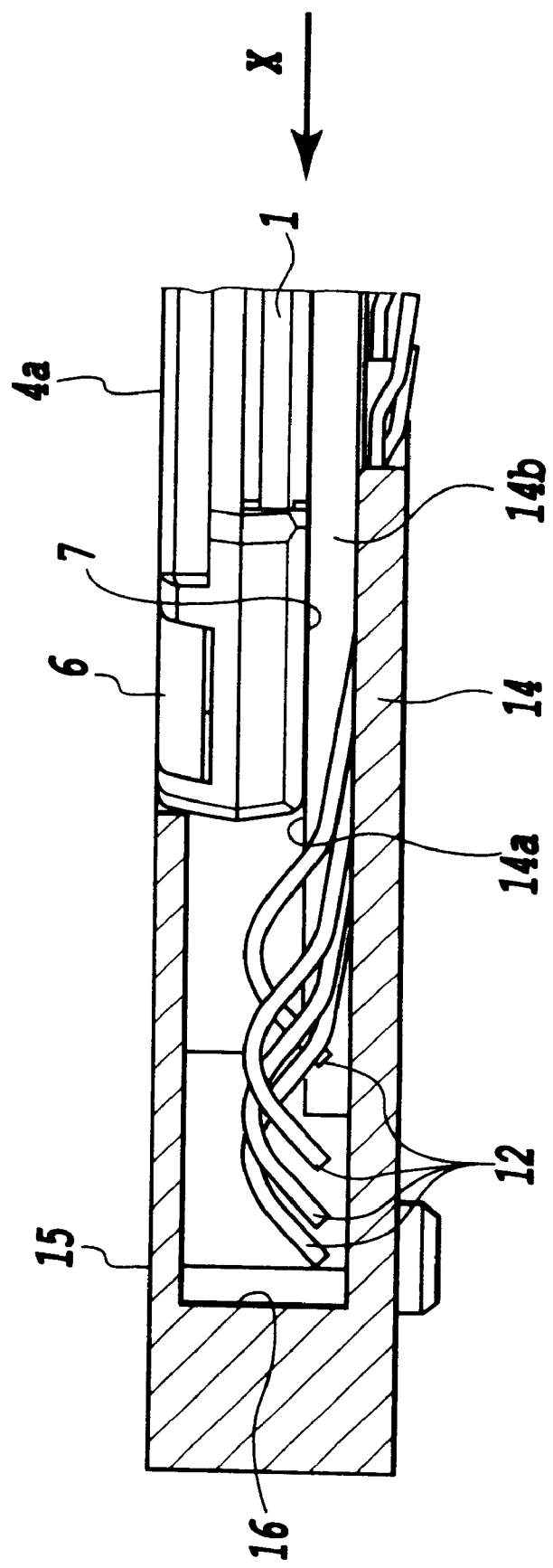
FIG. 14 is a vertical cross-sectional side view showing the IC card inserted in an inappropriate state into the card connector of FIG. 9 with the raised portion of the IC card engaging the top plate portion of the connector.
Figure 15:
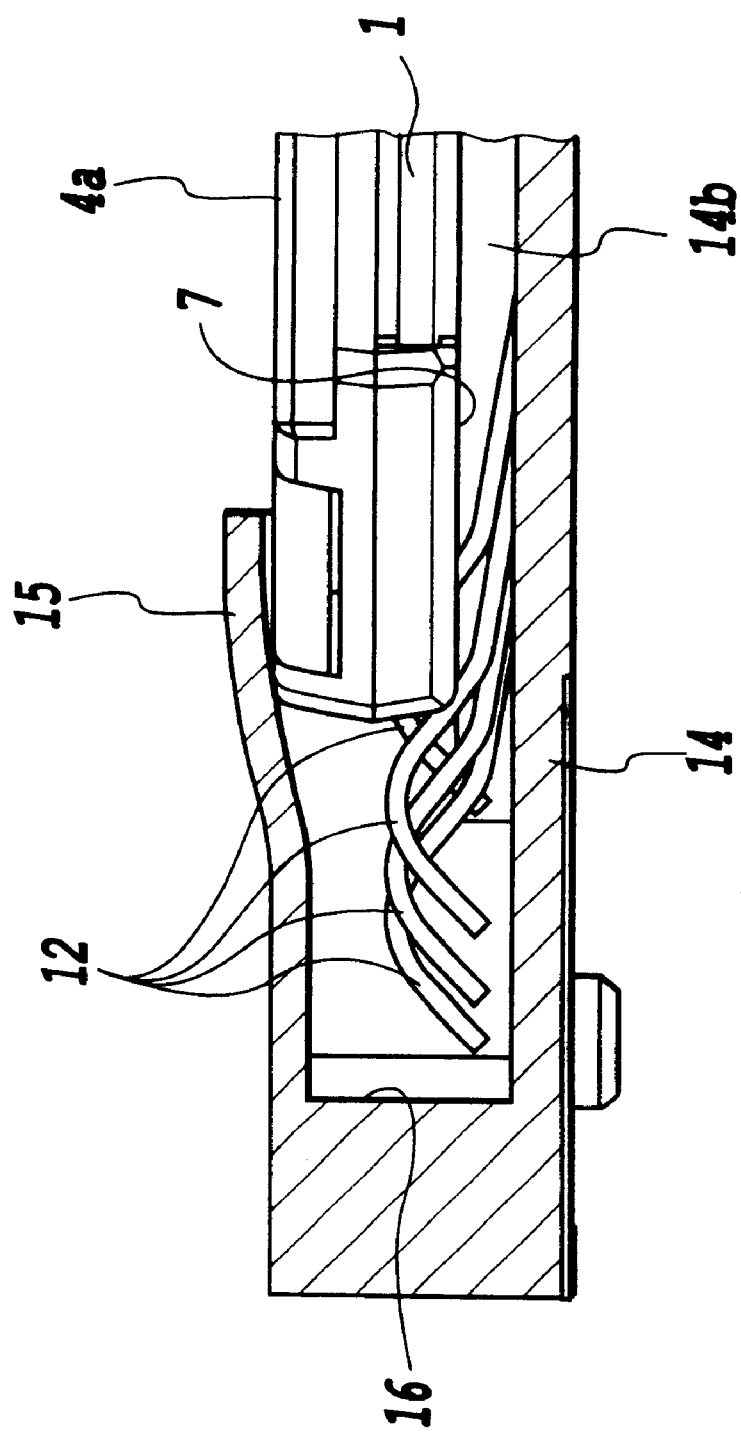
FIG. 15 is a vertical cross-sectional side view showing the IC card further inserted from the state of FIG. 14.

The IC card 1 applied to the first embodiment of the connector is similar to the one shown in Figs. 10A and 10B and its explanation is omitted here.

A connector 20 of the first embodiment comprises a connector body 21 which holds the IC card 1 so that it can be inserted into and retracted from the connector body, and electric contacts 22 that make electrical contact with the IC card 1 inserted into the connector body 21.

The connector body 21 has a pair of side portions 23, a bottom portion 24, a top plate portion 25, and an abutment portion 26. The side portions 23 have first side walls 23a for guiding left and right outer side surfaces of the IC card 1. The bottom portion 24 has support surfaces 24a for supporting a back surface 4 or front surface 7 of the IC card 1 and second side walls 24b that, when they support the back surface of the IC card 1, guide left and right side surfaces of a raised portion 4a formed on the back surface 4 so that the raised portion 4a can be moved in the IC card insertion direction X. The top plate portion 25 is disposed opposite the support surfaces 24a of the bottom portion 24 to keep the IC card 1 from floating up as it is inserted. The abutment portion 26 abuts against a front end of the IC card 1 to lock it at the properly inserted position or connected position when it is inserted in an appropriate orientation. In this construction, a card insertion path R is formed extending from a card insertion opening Ra of the IC card 1 to the abutment portion 26.

The second side walls 24b and the support surfaces 24a extend only in an area ranging from a predetermined blocking position P (see FIG. 7) in the card insertion path R to the abutment portion 26. In an area from the blocking position P to the card insertion opening Ra situated at the rear end of the connector body, only the first side walls 23a are formed. Hence, the card insertion opening Ra has a wider insertion space than other space in the card insertion path, allowing easy insertion of the IC card 1. This wide card insertion opening Ra has another advantage that, if the IC card 1 is inserted upside down, peripheral surfaces 4a of the raised portion 4a of the IC card 1 can be kept from pressing against the top plate portion 25 with force, thus protecting the top plate portion 25 against being damaged, as long as the back surface of the IC card 1 is kept in sliding contact with the surface of the bottom portion 24 as the card is inserted.

Further, the distance T2 from the blocking position P to the card insertion opening Ra (see FIG. 1) is set larger than the length t2 in the IC card insertion direction X of the inclined surface 5 of the IC card 1 (see FIG. 10B). Hence, when the IC card 1 is inserted in an inappropriate state (upside down) as shown in FIG. 5, the IC card 1, after being inserted more than the distance t2, has both its outer side surfaces 1a reliably guided by the paired first side walls 23a and thus can be inserted without a play until it abuts against the abutment portion 26.

The top plate portion 25 disposed opposite the bottom portion 24 of the connector body 21 protrudes like eaves and has integrally formed therewith a pair of left and right side restriction portions 25a protruding inwardly from the upper ends of the left and right side portions 23 and a front restriction portion 25b protruding inwardly from the upper end of the abutment portion 26. The top plate portion 25 therefore is U-shaped as a whole when viewed from above and its underside is flat with no steps.

The top plate portion 25 is formed with a rectangular engagement groove g which is enclosed on three sides by the edge of the top plate portion with one side cut away. A lateral width T1 of the engagement groove g (i.e., the width in a direction perpendicular to the IC card insertion direction) is set smaller than a lateral width t1 of both of the outer side surfaces 12, 12 of the IC card. A distance T3 from the underside of the top plate portion 25 of the connector 20 to the support surfaces 24a of the bottom portion 24 is set slightly larger than a distance (thickness) t3 from a recessed surface portion 4b of the IC card 1 to the front surface 7.

Figure 5:
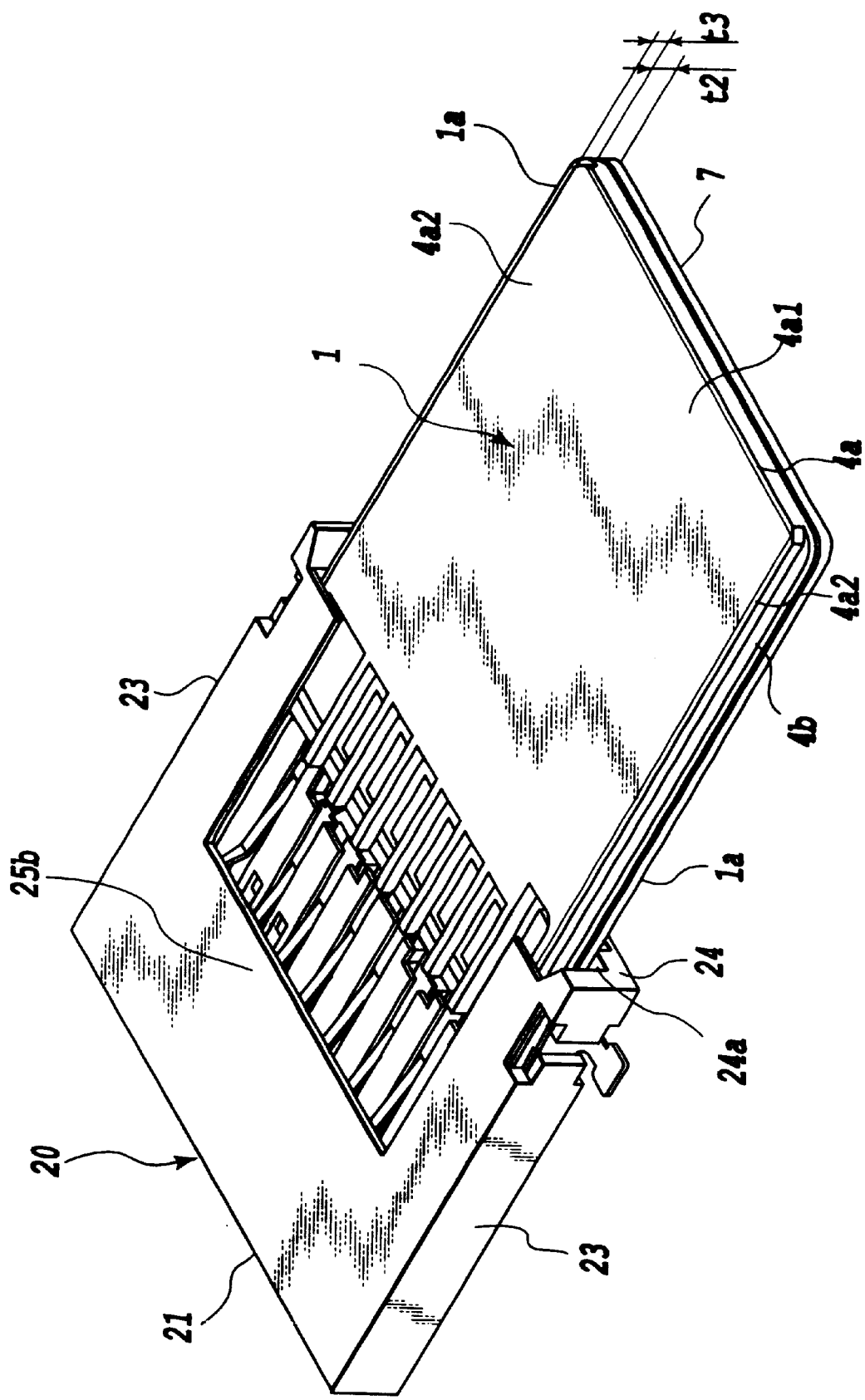
FIG. 5 is a perspective view showing the IC card being inserted in an improper orientation into the card connector of FIG. 1.

Further, the connector body 21 is provided with an erroneous insertion prevention mechanism which prevents the IC card 1 from being inserted to the properly inserted position when the IC card 1 is inserted in an inappropriate state as shown in FIG. 5, i.e., with its front surface supported on the support surfaces 24a of the bottom portion 24 (upside down).

Further, the connector body 21 is provided with an erroneous insertion prevention mechanism which prevents the IC card 1 from being inserted to the properly inserted position when the IC card 1 is inserted in an inappropriate state as shown in FIG. 5, i.e., with its back surface supported on the support surfaces 24a of the bottom portion 24 (upside down).

Figure 1:
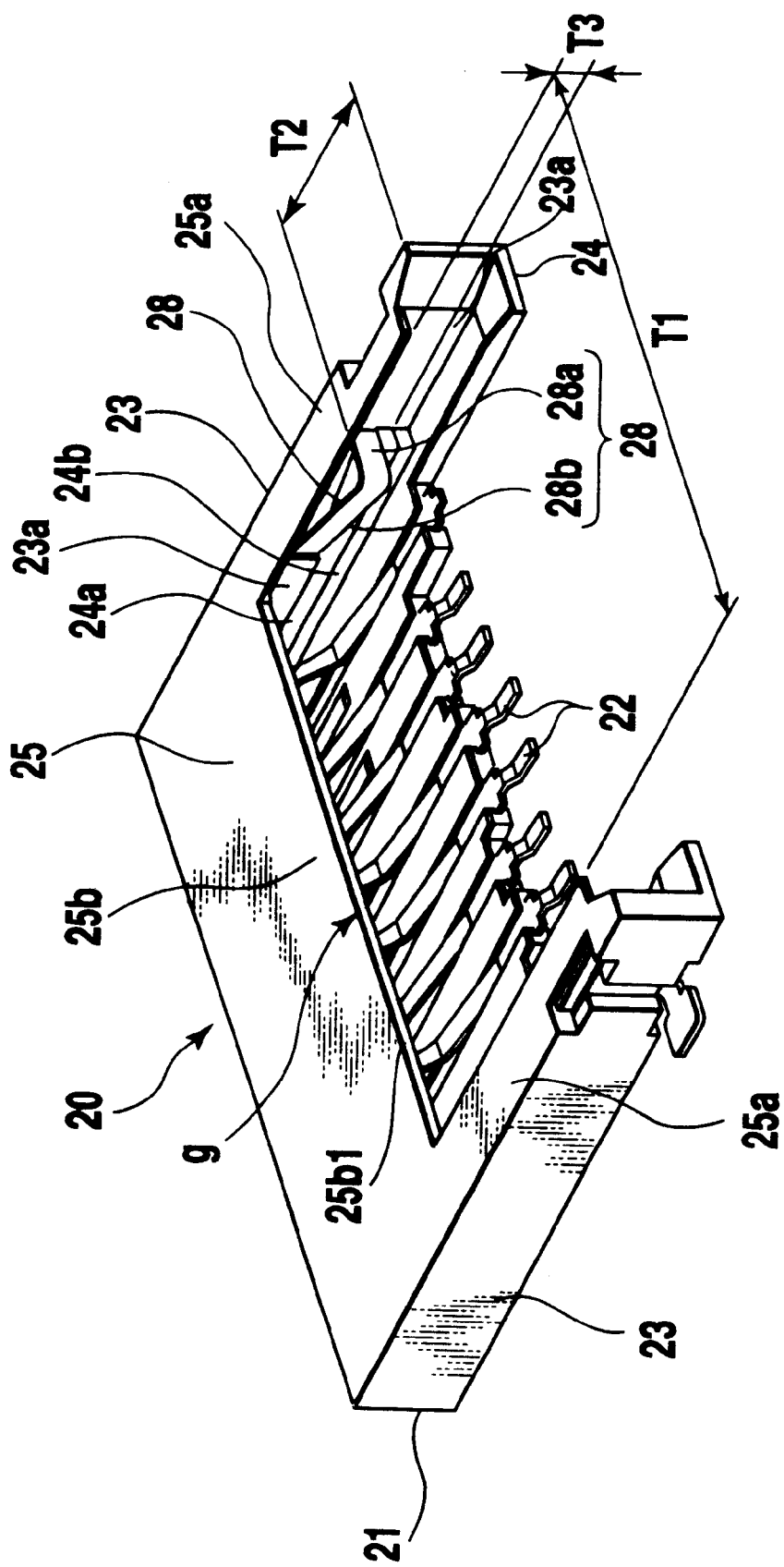
FIG. 1 is an external perspective view of a card connector according to a first embodiment of the invention.
Figure 2:
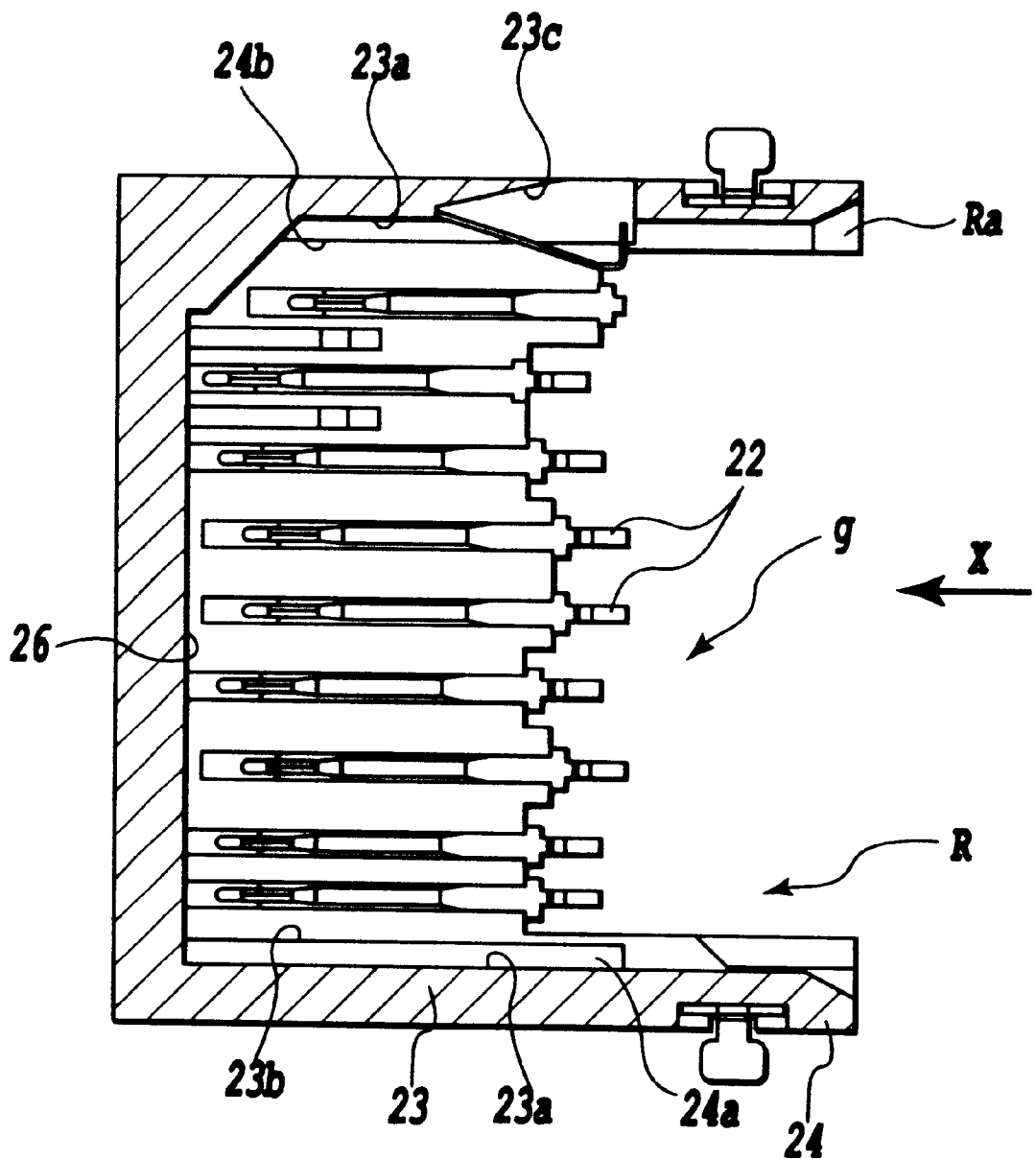
FIG. 2 is a horizontal cross section showing a bottom portion of the first embodiment of the invention.

The erroneous insertion prevention mechanism, as shown in FIGS. 1 and 2, comprises a leaf spring (urging means) 28 secured to the connector body 21. The leaf spring 28 is held almost horizontally, like a cantilever, with one end secured to one of the first side walls 23a. The leaf spring 28 has at its free end a sharply bent blocking surface 28a (blocking member).

The blocking surface 28a is normally held by an arm portion (urging means) 28b in a plane perpendicular to the insertion direction X and protrudes from the second side wall 24b at a protruding position. The first side wall 23a is formed with an escape groove 23c so that pressing the leaf spring 28 outwardly moves the blocking surface 28a to a retracted position in the escape groove 23c.

Figure 3:
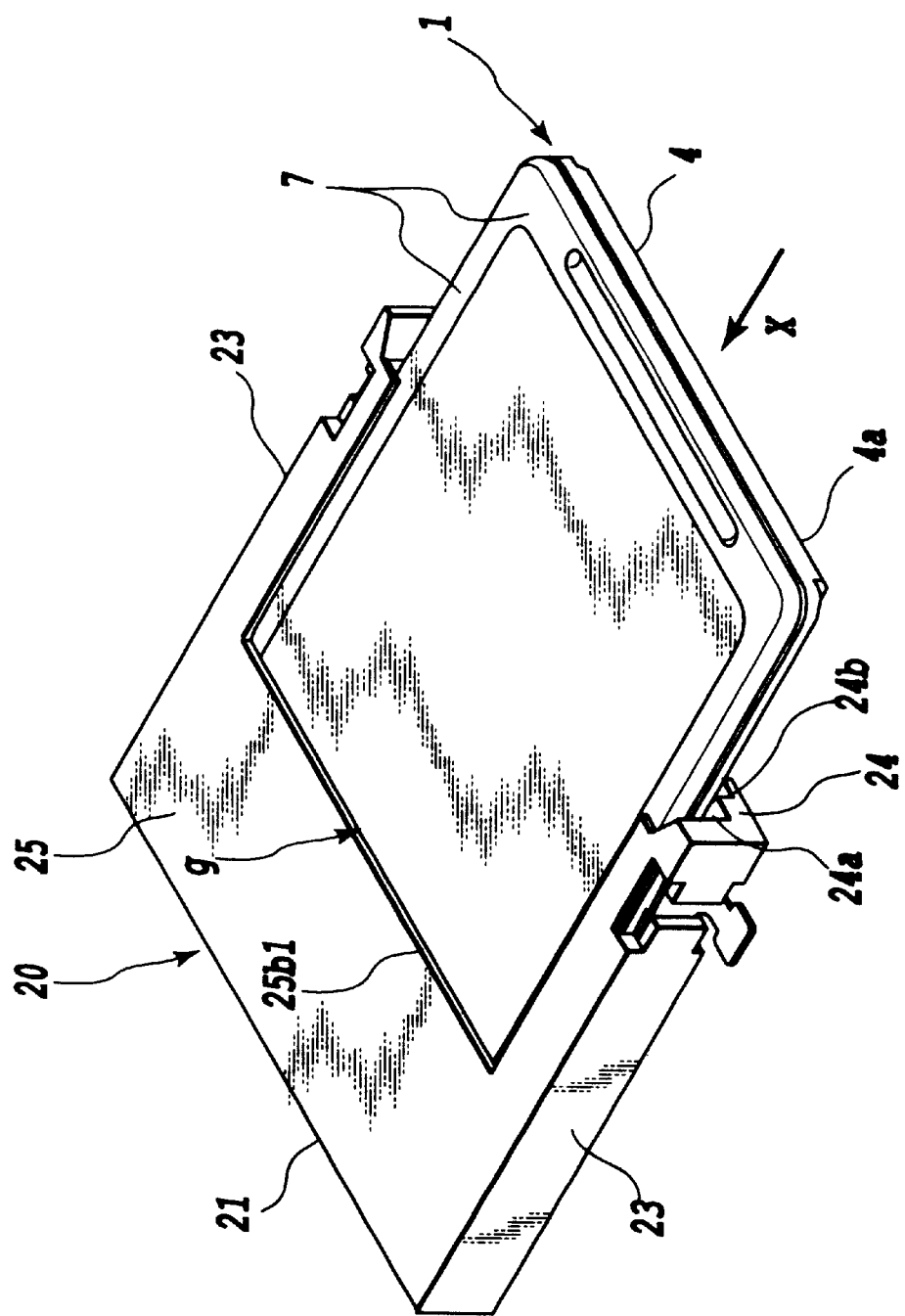
FIG. 3 is a perspective view showing an IC card inserted to an appropriate connected position in the card connector.
Figure 4:
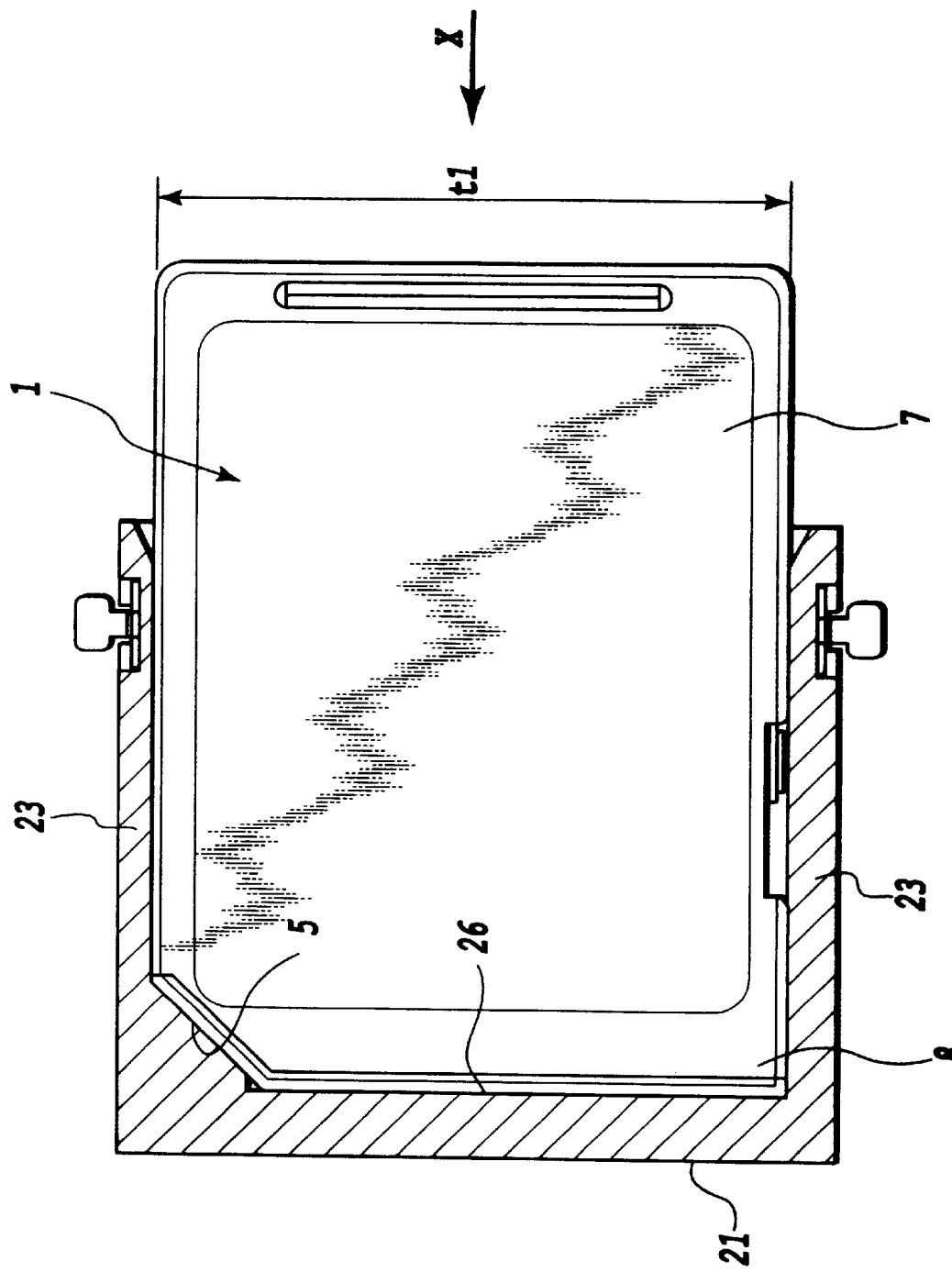
FIG. 4 is a horizontal cross section showing the IC card being inserted in the state of FIG. 3.

In the connector 20 constructed as described above, when the IC card 1 is held in a correct orientation and, as shown in FIGS. 3 and 4, inserted into the connector 20 with the back surface 4 of the IC card 1 supported on the surface of the bottom portion 24 of the connector body 21, the inclined surface 5 of the IC card 1 first comes into line contact with the blocking surface 28a of the leaf spring 28 provided at the blocking position P. Then, as the IC card 1 is moved further forwardly, the leaf spring 28 is guided outwardly along the inclined surface 5 until it is completely retracted to the retracted position accommodated in the escape groove 23c.

Therefore, the IC card 1 can smoothly reach the abutment portion 26 without being blocked by the leaf spring 28. When the IC card 1 is removed from the card insertion path R, the leaf spring 28 returns to the protruding position by the elastic force.

Figure 6:
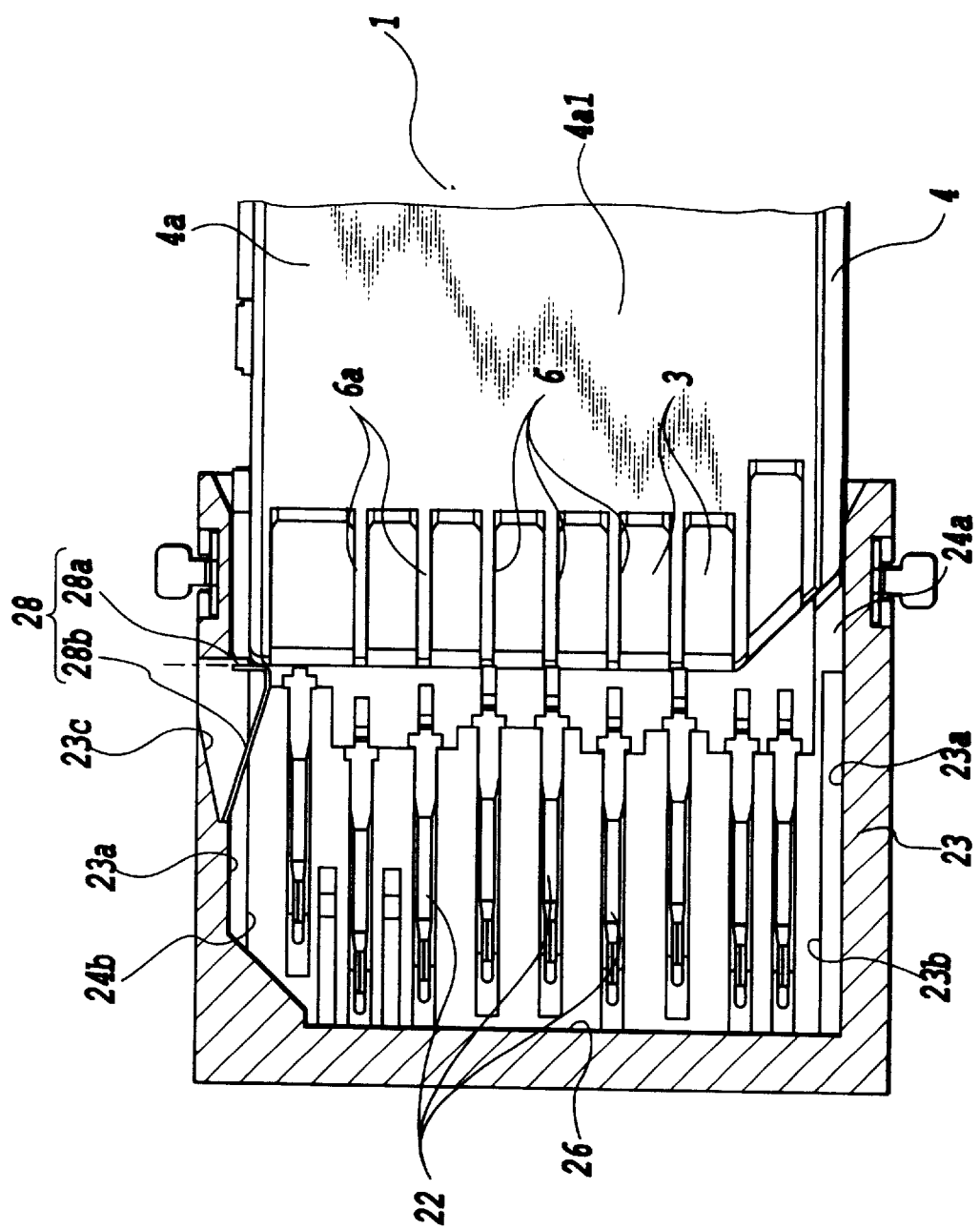
FIG. 6 is a cross section showing the IC card being inserted in the state of FIG. 5.
Figure 7:
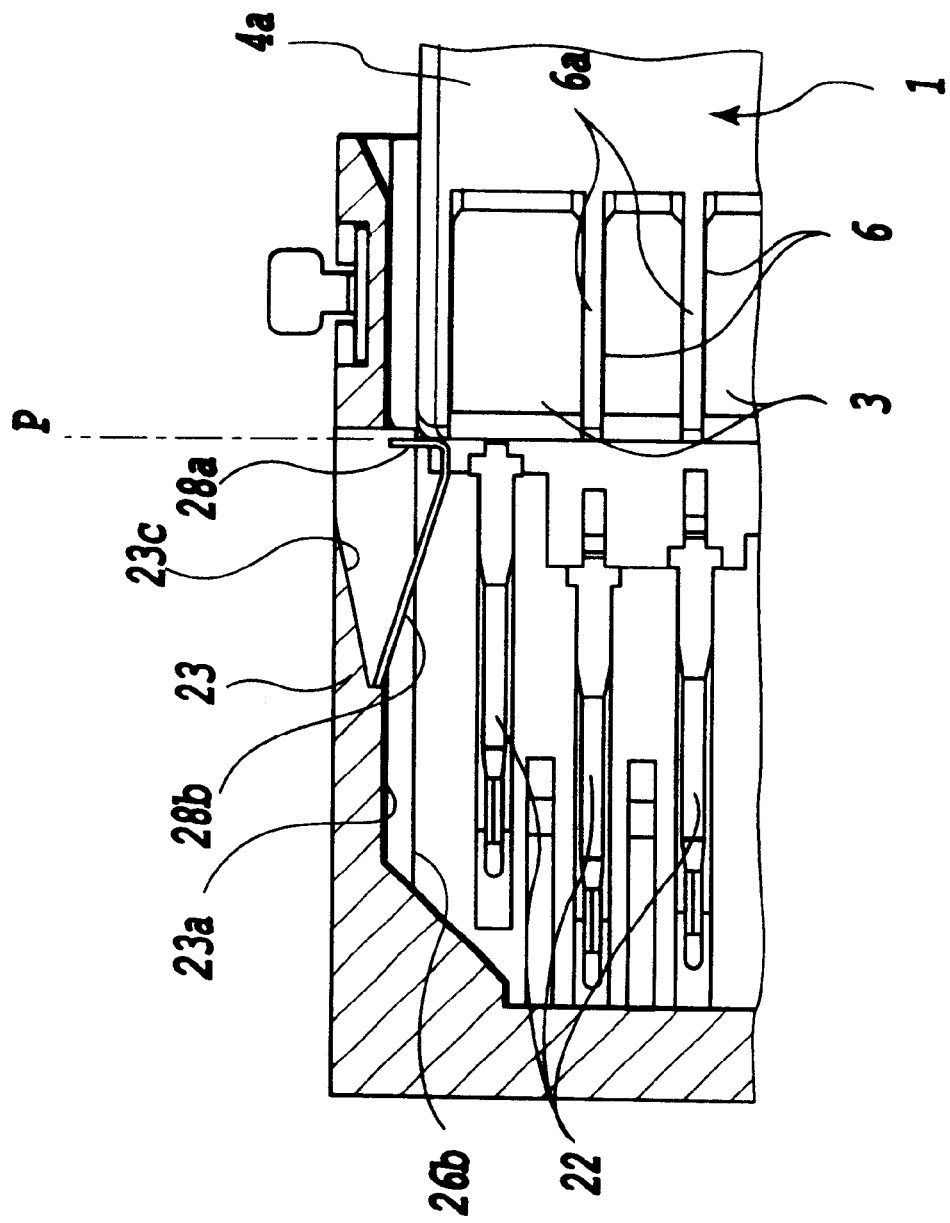
FIG. 7 is a partially enlarged cross section of FIG. 6.

When the IC card 1 is inserted into the card insertion path R from the card insertion opening Ra in an improper, inverted state as shown in FIG. 5, one front end of the IC card 1 comes into plane contact with the blocking surface 28a of the leaf spring 28 in a directly opposing state (see FIGS. 6 and 7). Hence, the leaf spring 28 does not move to the retracted position in the escape groove 23c but opposes the pushing force of the IC card 1, producing a stress acting almost in the card removing direction. As a result, the IC card 1 is reliably blocked at the blocking position P from moving forward.

Hence, the IC card 1 is situated at a position apparently removed back from the connected position with respect to the insertion direction, alerting the user that the IC card 1 is wrongly inserted, thereby protecting the connector body 21 and the IC card 1 against being broken due to forced insertion.

(Second Embodiment)

Figure 8:
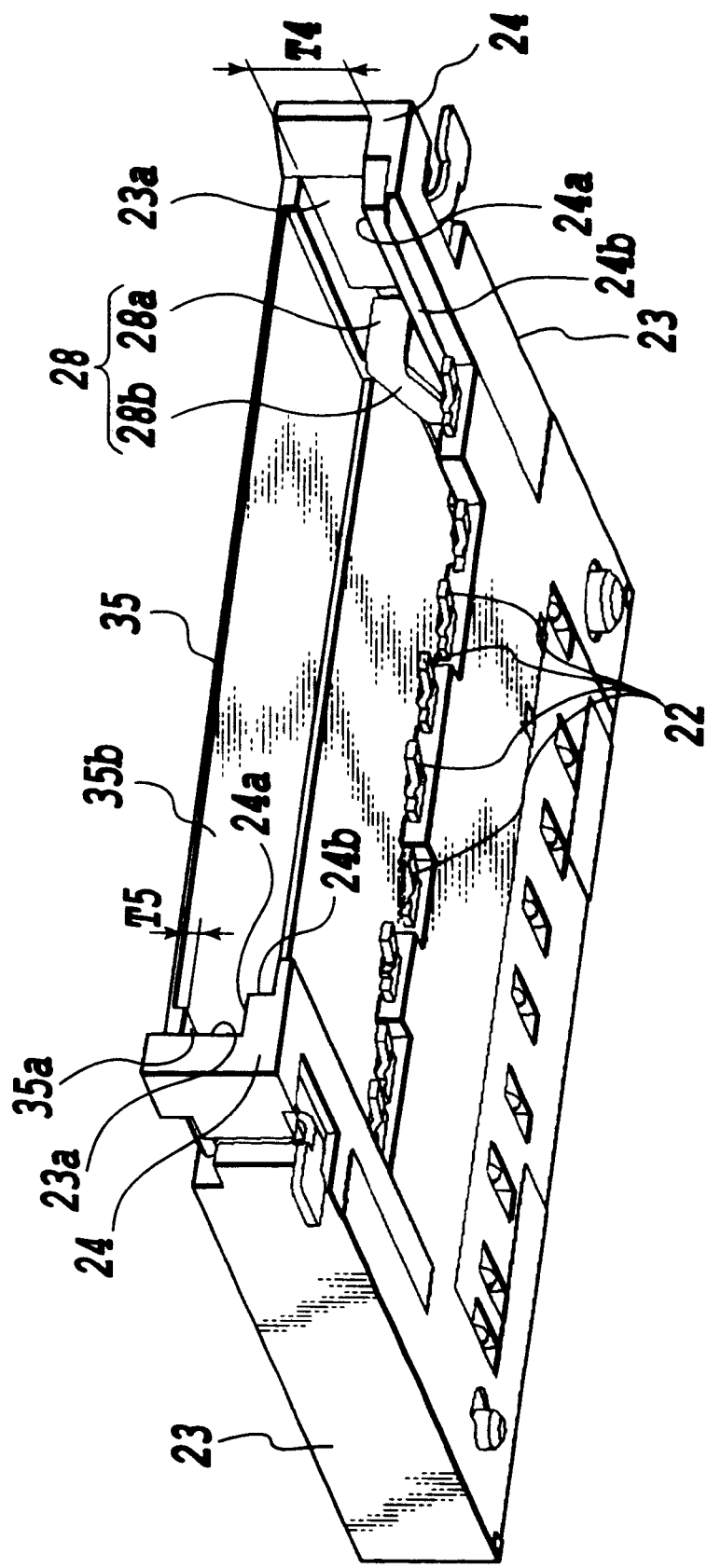
FIG. 8 is a perspective view of a second embodiment of the invention as seen from the bottom side.
Figure 9:
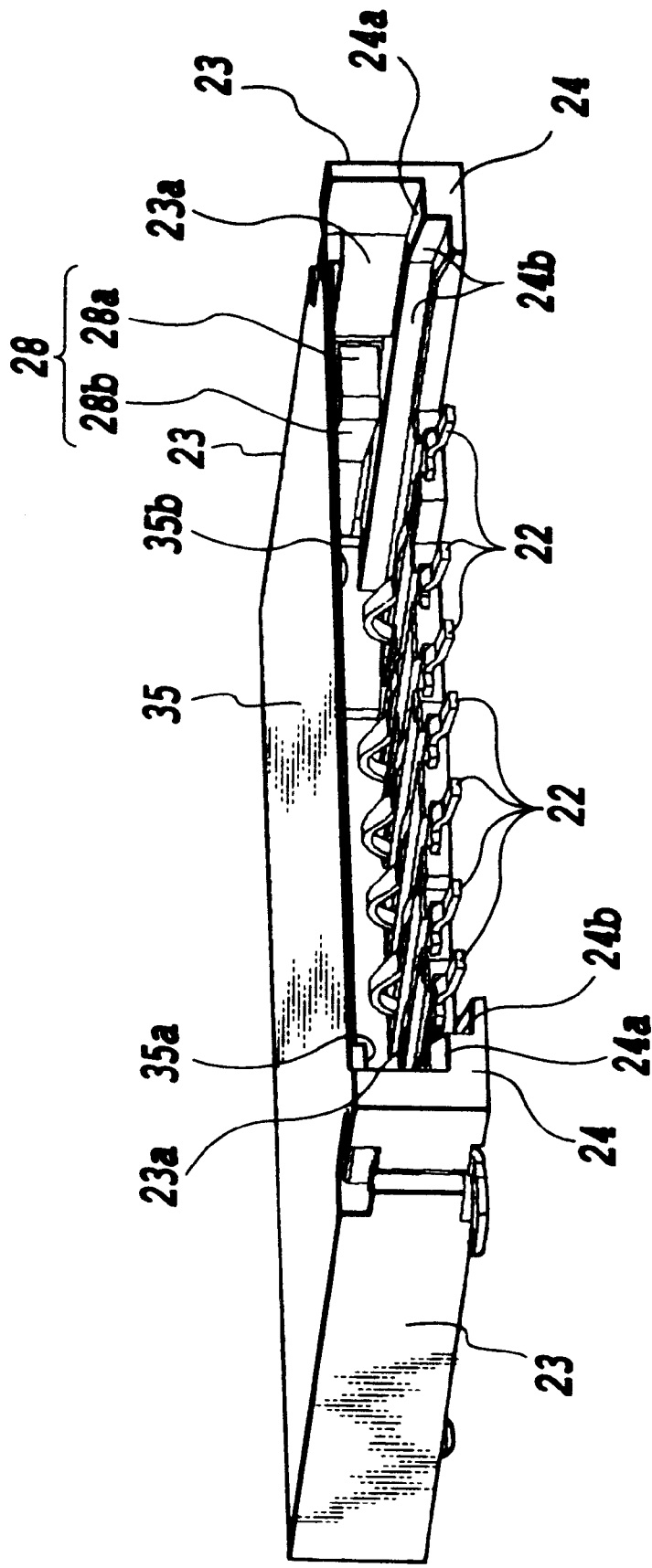
FIG. 9 is a perspective view of the card connector of FIG. 8 as seen from the top side.

Next, the second embodiment of this invention will be described by referring to FIGS. 8 and 9. Constitutional elements identical with or equivalent to those of the first embodiment are given like reference numbers and their descriptions are omitted.

In the first embodiment, the top plate portion 25 that prevents the IC card 1 from floating when it is inserted in the correct orientation has been described to be shaped like a letter U when viewed from above. A connector body 31 of a card connector 30 according to the second embodiment has a top plate portion 35 that is rectangular when viewed from above and which covers almost entirely the inserted portion of the IC card 1.

The underside of the top plate portion 35 is formed with restriction surfaces 35a extending longitudinally along both sides and with a recessed surface portion 35b recessed upwardly from the restriction surfaces 35a to function as an engagement groove. The restriction surfaces 35a face the support surfaces 24a of the bottom portion 24 and their distance T4 is set slightly larger than a distance t3 between the recessed surface portions 4b and the front surface 7 of the IC card 1 (see FIG. 5).

In this second embodiment, too, one of the side portions 23 is provided with an erroneous insertion prevention mechanism formed of the leaf spring 28 or the like, with the blocking surface 28a situated at the blocking position P. This is similar to the first embodiment. The second embodiment, however, differs from the first embodiment in that the support surfaces 24a and the second side walls 24b of the bottom portion 24 are formed not only in an area in front of the escape groove but also in an area ranging from the rear end of the bottom portion 24 to the blocking position P. In this regard the second embodiment therefore is much longer than the first embodiment. In other respects, the construction of the second embodiment is similar to that of the first embodiment.

In the second embodiment constructed as described above, if the IC card 1 is inserted in an inappropriate state, or upside down, the back surface 4 of the IC card 1 opposes the restriction surfaces 35a with a small gap therebetween and the raised portion 4a protruding upward opposes the recessed surface portion 35b with a small gap therebetween, so that the IC card can be inserted smoothly until it reaches the blocking position P. When it reaches the blocking position P, the front end of the IC card 1 engages the blocking surface 28a of the leaf spring 28 and a further inward advance is blocked. This blocking position P is apparently short of properly inserted position (where the abutment portion 26 and the front end portion of the IC card 1 engage) and therefore the user can easily recognize the wrongly inserted state.

When the IC card 1 is inserted in an appropriate state, the leaf spring 28 is pushed into the escape groove 23c by the inclined surface 5 of the IC card 1, so that the leaf spring 28 does not block the insertion of the card. Further, because the restriction surfaces 35a keep the IC card 1 from floating, the IC card 1 is guided smoothly and properly to the connected position. Moreover, in the second embodiment because the top plate portion 35 is rectangular in shape, it works as a reinforcement member increasing the overall rigidity of the connector 20 and also effectively protects the IC card and prevents ingress of dust.

While in the above embodiment the blocking member is formed by the blocking surface 28a of the leaf spring 28 and the urging means by the arm portion 28b of the leaf spring 28, the blocking member and the urging means may be constructed by separate members. For example, the blocking member may be formed by a rodlike member retractably held on the side of the card body and the urging means by a coil spring that urges the rodlike member. These two members are not limited to the above embodiment.

As explained above, according to the card connector of this invention, when the IC card is wrongly inserted, the IC card is blocked at the blocking position short of the connected position and the further insertion is prevented. This alerts the user that the IC card is wrongly inserted and thus the user will not insert the IC card forcibly, which in turn prevents a possible damage to the connector body and IC card.

Further, because the second side walls that guide the side surfaces of the raised portion of the IC card is eliminated in an area ranging from the rear end of the connector body to the blocking position, the insertion space ranging from the insertion opening to the blocking position becomes wider so that even if the IC card is inserted upside down, it can be inserted smoothly to the blocking position. This eliminates a possibility of the connector body being damaged by the contact with the IC card, thus maintaining the high connection reliability of the connector.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. A card connector having a connector body for removably holding an IC card and electric contacts for making electric connection with the IC card inserted into the connector body, wherein the IC card has on its back surface a raised portion and is slightly narrower than a connector body width between its both side surfaces, the connector body comprising:

a pair of left and right side portions each having a first side wall, the first side walls guiding left and right side surfaces of the IC card in an insertion/retraction direction of the IC card;

a bottom portion having a support surface to support a front surface or back surface of the IC card and a pair of left and right second side walls, the second side walls projecting inwardly from the first side walls and, in an IC card back surface supporting state, guiding side surfaces of the raised portion formed on the back surface of the IC card in the insertion/retraction direction of the IC card;

a top plate portion provided opposite the bottom portion to keep the inserted IC card from floating up; and an erroneous insertion prevention mechanism to allow the insertion of the IC card when it is inserted into the connector body in an appropriate state with the front surface of the IC card facing up and, when the IC card is inserted in an inappropriate state with the front surface facing down, to block the forward movement of the IC card in the card insertion direction at a blocking position, the blocking position being set a predetermined distance forward from a rear end of the card body;

wherein the erroneous insertion prevention mechanism has:

a blocking member retractably supported on one of the first side walls in such a manner that when the blocking member is projected, it is situated inward from the second side wall and that when the blocking member is retracted, it is situated outward from the first side wall; and an urging means to normally urge the blocking member to project inwardly from the second side wall;

wherein when the IC card is correctly inserted, the blocking member is guided by the inclined surface formed in the IC card to be retracted outwardly from the first side wall and when the IC card is wrongly inserted, the blocking member abuts against a front end of the IC card, blocking the further insertion of the IC card at the blocking position;

wherein the left and right second side walls and the support surface of the bottom portion are eliminated in an area ranging from a rear end of the first side wall to the blocking position.

2. A card connector according to claim 1, wherein a distance in the IC card insertion direction from the rear end of the first side wall to the blocking position is set larger than a length in the IC card insertion direction of the inclined surface formed in the IC card.

3. A card connector having a connector body for removably holding an IC card and electric contacts for making electric connection with the IC card inserted into the connector body, wherein the IC card has on its back surface a raised portion and is slightly narrower than a connector body width between its both side surfaces, the connector body comprising:

a pair of left and right side portions each having a first side wall, the first side walls guiding left and right side surfaces of the IC card in an insertion/retraction direction of the IC card;

a bottom portion having a support surface to support a front surface or back surface of the IC card and a pair of left and right second side walls, the second side walls projecting inwardly from the first side walls and, in an IC card back surface supporting state, guiding side surfaces of the raised portion formed on the back surface of the IC card in the insertion/retraction direction of the IC card;

a top plate portion provided opposite the bottom portion to keep the inserted IC card from floating up, the top plate portion having a flat underside; and an erroneous insertion prevention mechanism to allow the insertion of the IC card when it is inserted into the connector body in an appropriate state with the front surface of the IC card facing up and, when the IC card is inserted in an inappropriate state with the front surface facing down, to block the forward movement of the IC card with respect to the card insertion direction at a blocking position, the blocking position being set a predetermined distance forward from a rear end of the card body;

wherein the erroneous insertion prevention mechanism has:

a blocking member retractably supported on one of the first side walls in such a manner that when the blocking member is projected, it is situated inward from the second side wall and that when the blocking member is retracted, it is situated outward from the first side wall; and an urging means to normally urge the blocking member to project inwardly from the second side wall;

wherein when the IC card is correctly inserted, the blocking member is guided by the inclined surface formed in the IC card to be retracted outwardly from the first side wall and when the IC card is wrongly inserted, the blocking member abuts against a front end of the IC card, blocking the further insertion of the IC card at the blocking position;

wherein a vertical distance between the top plate portion and the support surface of the bottom portion is increased in an area ranging from a rear end of the first side wall to the blocking position.

4. A card connector according to claim 3, wherein a distance in the IC card insertion direction from the rear end of the first side wall to the blocking position is set larger than a length in the IC card insertion direction of the inclined surface formed in the IC card.

5. A card connector having a connector body for removably holding an IC card and electric contacts for making electric connection with the IC card inserted into the connector body, wherein the IC card has on its back surface a raised portion and is slightly narrower than a connector body width between its both side surfaces, the connector body comprising:

a pair of left and right side portions each having a first side wall, the first side walls guiding left and right side surfaces of the IC card in an insertion/retraction direction of the IC card;

a bottom portion having a support surface to support a front surface or back surface of the IC card and a pair of left and right second side walls, the second side walls projecting inwardly from the first side walls and, in an IC card back surface supporting state, guiding side surfaces of the raised portion formed on the back surface of the IC card in the insertion/retraction direction of the IC card;

a top plate portion provided opposite the bottom portion to keep the inserted IC card from floating up; and an erroneous insertion prevention mechanism to allow the insertion of the IC card when it is inserted into the connector body in an appropriate state with the front surface of the IC card facing up and, when the IC card is inserted and is in an inappropriate state with the front surface facing down, to block the forward movement of the IC card with respect to the card insertion direction at a blocking position, the blocking position being set a predetermined distance forward from a rear end of the card body;

wherein the erroneous insertion prevention mechanism has:

a blocking member retractably supported on one of the first side walls in such a manner that when the blocking member is projected, it is situated inward from the second side wall and that when the blocking member is retracted, it is situated outward from the first side wall; and an urging means to normally urge the blocking member to project inwardly from the second side wall;

wherein when the IC card is correctly inserted, the blocking member is guided by the inclined surface formed in the IC card to be retracted outwardly from the first side wall and when the IC card is wrongly inserted, the blocking member abuts against a front end of the IC card, blocking the further insertion of the IC card at the blocking position;

wherein in an area ranging from a rear end of the first side wall to the blocking position, the top plate portion has an engagement groove to receive the raised portion of the IC card so that the IC card can be moved in the insertion/retraction direction of the card.

6. A card connector according to claim 5, wherein the engagement groove is formed by a recessed groove extending inwardly from a rear end of the top plate portion and having a width slightly larger than that of the raised portion.

7. A card connector according to claim 5, wherein the engagement groove is formed by a recessed surface portion recessed upwardly from the underside of the top plate portion.

8. A card connector according to claim 5, wherein a distance in the IC card insertion direction from the rear end of the first side wall to the blocking position is set larger than a length in the IC card insertion direction of the inclined surface formed in the IC card.

* * * * *